(12) United States Patent
Bjørkgård

(10) Patent No.: US 6,962,358 B2
(45) Date of Patent: Nov. 8, 2005

(54) CONNECTION DEVICE FOR MUTUAL CONNECTION OF TWO OBJECTS

(75) Inventor: Sven Bjørkgård, KOngsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 111 days.

(21) Appl. No.: 10/312,258

(22) PCT Filed: Jun. 25, 2001

(86) PCT No.: PCT/NO01/00267

§ 371 (c)(1),
(2), (4) Date: Dec. 24, 2002

(87) PCT Pub. No.: WO02/06067

PCT Pub. Date: Jan. 24, 2002

(65) Prior Publication Data

US 2003/0089546 A1    May 15, 2003

(30) Foreign Application Priority Data

Jun. 27, 2000    (NO) ................................. 20003358

(51) Int. Cl.⁷ ................................................ B60G 9/02
(52) U.S. Cl. ........................ 280/124.116; 280/124.156; 280/352; 384/220; 267/141.7; 267/294
(58) Field of Search .............................. 180/349, 352; 280/124.156, 124.116; 267/141.1, 141.3–141.5, 267/141.7, 294, 293, 280–282; 384/220–222; 403/224–226

(56) References Cited

U.S. PATENT DOCUMENTS

| | | | |
|---|---|---|---|
| 4,778,199 A | 10/1988 | Haggerty et al. | |
| 4,880,319 A * | 11/1989 | Haggerty | .................... 384/215 |
| 5,427,404 A | 6/1995 | Stephens | |
| 5,649,719 A | 7/1997 | Wallace et al. | |
| 5,967,668 A | 10/1999 | Germano | |
| 5,975,760 A | 11/1999 | Germano | |

FOREIGN PATENT DOCUMENTS

| | | |
|---|---|---|
| DE | 3741440 | 7/1988 |
| DE | 4033569 | 10/1991 |
| DE | 4139582 | 11/1992 |
| EP | 0 556 764 | 8/1993 |

* cited by examiner

Primary Examiner—Ruth Ilan
(74) Attorney, Agent, or Firm—Finnegan, Henderson, Farabow, Garrett & Dunner, L.L.P.

(57) ABSTRACT

A coupling device for elastic interconnection of, e.g., arms (66) which are linked to a frame (60) of the vehicle. The coupling device (92) substantially comprises two annular, conical portions (112, 114) of a rubber elastic material and an axle (94). A radially internal side of these annular material portions (112, 114) abuts against contact portions (98, 100) at the ends of the axle (94). The coupling device (92) further comprises two axially opposite rings (124, 126) which are arranged to abut against respective external sides of the annular material portions (112, 114). The axle (94) and the rings (124, 126) have attachment areas (96, 121 and 123 respectively), via which they can be attached to the wheel axle housing (82) and the frame (60) respectively. The attachment area (96) for the axle (94) is located between the first contact portions (98, 100).

4 Claims, 3 Drawing Sheets

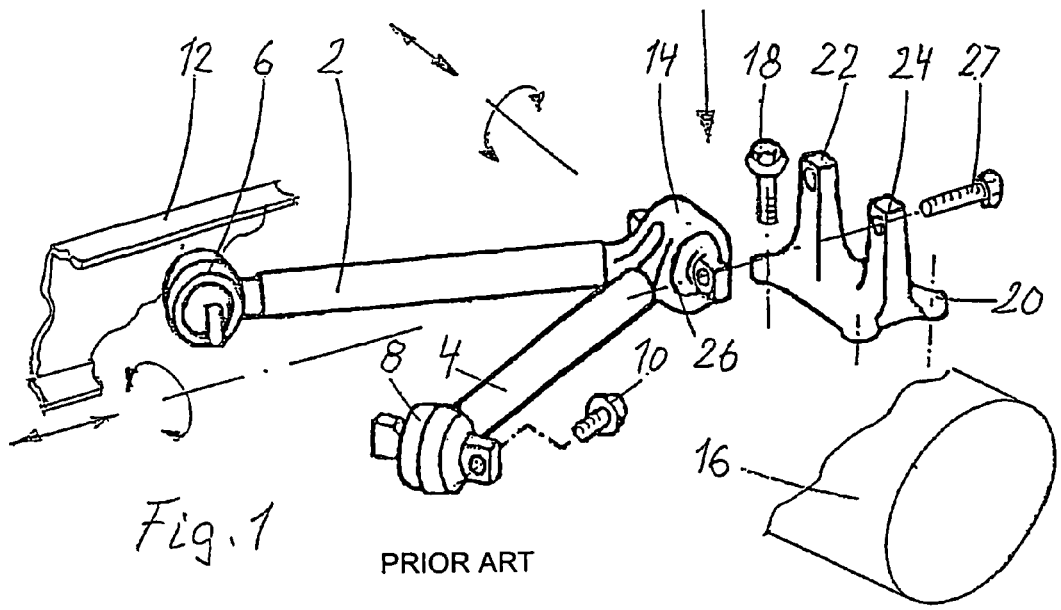
Fig. 1 PRIOR ART
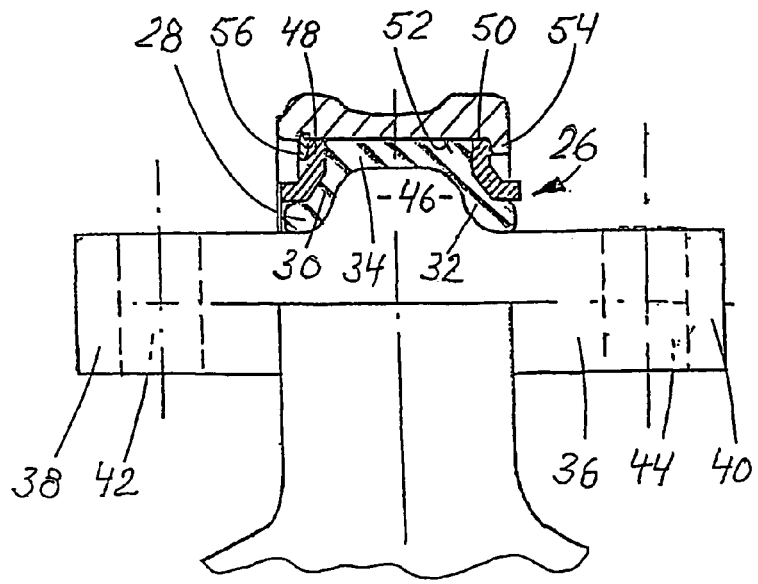
PRIOR ART Fig. 2

CONNECTION DEVICE FOR MUTUAL CONNECTION OF TWO OBJECTS

BACKGROUND OF THE INVENTION

The invention relates to a coupling device for elastic interconnection of a first and a second object.

A coupling device of this type is used, e.g., in vehicles in connection with mounting a wheel axle housing in a chassis of the vehicle, as disclosed, e.g., in U.S. Pat. No. 5,649,719.

If the coupling device's first contact device is securely connected to a central portion of the wheel axle housing, i.e. the first object, between and under two frame beams of the vehicle, and the second contact device is securely connected to a second end portion of two arms, whose first end portions are each rotatably connected to a frame beam, the object can be achieved that a movement of the wheel axle housing both in the vehicle's longitudinal direction and in the vehicle's horizontal transverse direction can substantially be prevented, while a relative movement of the wheel axle housing and the chassis in the height direction during a relative rotation or tilting of the chassis and the wheel axle housing at the linkage between the chassis and the first end portion of the arms, and a rolling of the wheel axle housing relative to the chassis are substantially possible.

The counteraction of the movement of the chassis in the vehicle's longitudinal direction and transverse direction depends on attempts being made hereby to compress portions of the rubber elastic material between the contact portions and on the rubber elastic material exerting substantial resistance against such a compression since it is virtually incompressible. However, the compression is not completely counteracted, since the material has a limited opportunity of escaping laterally at the material's free surfaces. The tilting is permitted since the rubber elastic portion is hereby mainly influenced only by a shearing stress and does not offer such great resistance against it.

FIG. 1 is a perspective view of such a known mounting of a wheel axle housing where a coupling device of the above-mentioned type is employed, with an exploded view of the components, and FIG. 2 illustrates a longitudinal section through the coupling device.

First end portions 6, 8 of two arms 2, 4 are each connected via respective screws 10 to the longitudinal frame beam 12 of a vehicle. The second end portions of the arms 2, 4 converge at and are securely connected to a connecting piece 14.

The connecting piece 14 is located above and in front of a wheel axle housing 16. To the upper portion of this housing 16, a bracket 20 with two arms 22, 24 is attached by means of screws 18.

The connecting piece 14 and the bracket 20 are interconnected by means of a coupling device 26 of the above-mentioned type by means of screws 27, with the connecting piece 14 clasping the coupling device 26.

As illustrated in FIG. 2, the coupling device 26 comprises a sleeve-shaped device or rubber device 28 which is made of a rubber elastic material, and which has two conical end portions 30, 32, which are interconnected via an axial portion 34.

Through the rubber device 28 there extends a first contact device 36 whose end portions have attachment areas 38, 40 extending outwards past each end of the rubber device 28 and provided with holes 42, 44 for the screws 27. A central, extended portion or first contact portion 46 of the first contact device 36 extends radially outwards and is attached to the central portion 34 of the rubber device 28.

Outside the rubber device 28 is mounted a second contact device comprising two annular contact portions or rings 48, 50, each of which abuts against an end portion 30, 32 of the rubber device 28.

The coupling device 26 is attached in a bore 52 which is provided in the connecting piece 14, abutting against a shoulder 54 on one side and against a securing ring 56 on the other side.

Since the end portions 38, 40 of the first contact device 36 project through and out of the rubber device 28, taking up space radially, the radial measurement of the conical portions 30, 32 of the rubber device 28 is consequently relatively small, with the result that these portions are not capable of appreciably counteracting a movement of the wheel axle housing 16 in the vehicle's transverse direction. This results in the vehicle having unsatisfactory driving characteristics.

Furthermore, the known coupling device is expensive and requires a great deal of space. Moreover, with the known device the wheel axle housing has to be located at a fixed height relative to the chassis when mounting the coupling device, resulting in a time-wasting assembly process.

Also U.S. Pat. No. 5,967,668 and U.S. Pat. No. 5,975,760 disclose coupling devices. None of these, however, show a specific arrangement of attachment area, rubber components and contact devices as in the coupling device according to the invention.

The object of the invention is to provide a coupling device of the above-mentioned type which is encumbered to a lesser extent by the above-mentioned disadvantages.

SUMMARY OF THE INVENTION

This object is achieved by a coupling device for elastic interconnection of a first and a second object, comprising a device of a rubber elastic material, with two annular material portions, each of which extends round a longitudinal axis at an axial distance apart and with an inner and an outer, substantially conical side facing away from and towards the longitudinal axis towards respectively, a first contact device which extends axially through the annular material portions and has first contact portions which are arranged to abut against respective inner sides of the material portions, a second contact device with second portions which is arranged to abut against respective outer sides of the material portions, where the first contact device has a first attachment area, whereby it can be attached to one of the objects.

BRIEF DESCRIPTION OF THE DRAWINGS

The invention will now be described in greater detail with reference to the drawings.

FIGS. 1 and 2 illustrate a known coupling device.

DETAILED DESCRIPTION OF THE INVENTION

Figure 4:
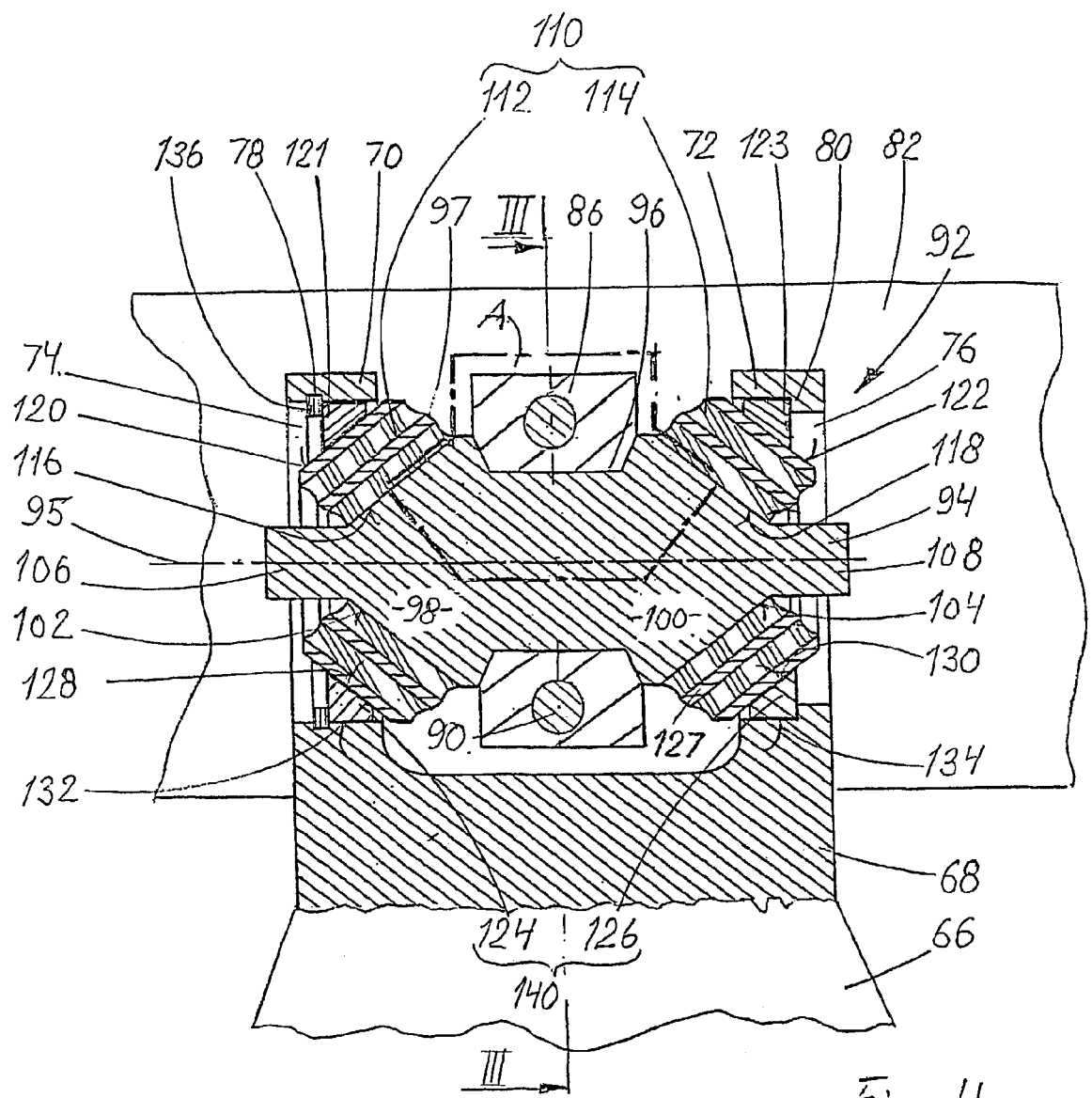
FIG. 4 illustrates a section along line IV—IV in FIG. 3, through a coupling device according to the invention and adjacent portions of a vehicle.
Figure 3:
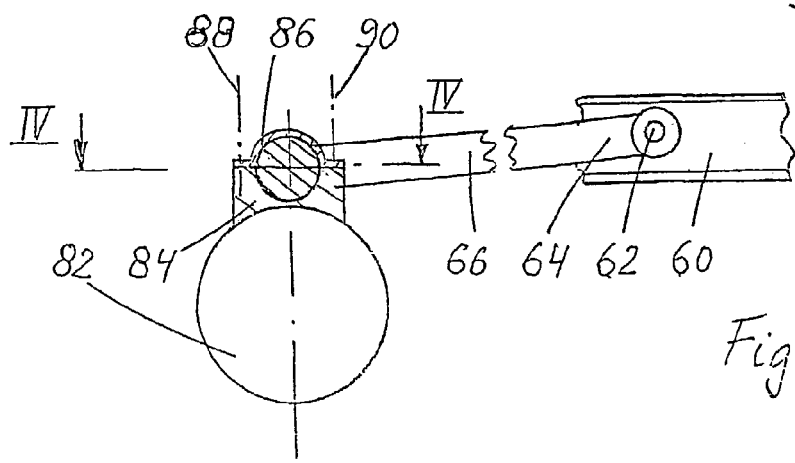
FIG. 3 illustrate a first embodiment of a coupling device according to the invention and is a vertical longitudinal section through a vehicle along line III—III in FIG. 4.

As illustrated in FIGS. 3 and 4, to a frame beam 60 of a vehicle there is attached via, e.g., a screw 62, a first end portion 64 of an arm 66 of a pair of arms for mounting a wheel axle housing 82. In a similar manner a second arm (not shown) of the pair of arms is attached to an opposite frame beam of the vehicle. From their first end portions 64 the arms extend backwards towards each other, and the second end portions of the arms 66 are securely interconnected via a connecting piece 68 (FIG. 4). This connecting piece 68 is U-shaped, viewed from above, with two legs 70, 72 which project backwards and have coaxial through-going bores 74, 76. In the radially internal surface of one bore 74 there is provided a radially inwardly open, circumferential groove 78, and in the second bore 76 a shoulder 80 is provided in the radially internal surface portion.

On the wheel axle housing 82 there is provided an upwardly facing contact portion 84 with two upwardly open threaded holes. A hoop or curved piece 86 is arranged to be secured to the contact portion 84 by means of two screws 88, 90, which are screwed into their respective holes.

The arms' connecting piece 68 and the wheel axle housing 82 are interconnected via a coupling device 92.

This coupling device 92 comprises a first contact device 94 in the form of a rotationally symmetrical axle with a longitudinal axis 95. The contact device 94 comprises a first attachment area which is provided in the form of a central, circumferential, radially outwardly open groove or recess 96, whose cross sectional shape is adapted to the cross sectional shape of the hoop 86. This cross sectional shape is preferably radially inwardly tapering, and may be, for example, V-shaped or trapezoidal.

The first contact device 94 furthermore has two end portions or first contact portions 98, 100, whose surfaces 102, 104 are provided in the form of conical surface portions tapering away from each other, where the longitudinal axes of the cones coincide with the longitudinal axis 95.

The end portions 98, 100 may have respective end journals 106, 108 projecting away from each other and slightly out of the bores 74, 76.

The first contact device 94 abuts against and supports a device 110 of a rubber elastic material. This device 110 comprises two annular material portions or pieces 112, 114, each of which has a radially internal surface 116, 118 and a radially external surface 120, 122 in the form of coaxial conical surface portions.

Radially outside the rubber elastic device 110 there is provided a second contact device 140 comprising second contact portions, or more specifically a first ring 124 and a second ring 126, each with a radially internal, conical surface 128, 130 which is adapted to the external surface 120, 122 of the material portions 112, 114, and a radially external, cylindrical surface 132, 134, whose diameter is adapted to the diameter of the bores 74, 76 in the legs 70, 72 of the connecting piece 68.

The connecting device 92 can be secured to the legs 70, 72 by the first ring 124 having a second attachment area 121, which is arranged to abut against a lock ring 136, which is inserted in the groove 78 of the leg 70, and in the same way by the second ring 126 having a second attachment area 123 which is arranged to abut against the shoulder 80 of the leg 72. The lock ring 136 can be brought into the groove 78 after the coupling device's rubber elastic material has been elastically compressed in the axial direction towards the right in FIG. 4, the coupling device hereby leaning against the shoulder 80. By this means it is ensured that the annular material portions 112, 114 are secured without play between the first and the second contact devices.

Alternatively, in the bore 74 screw threads may be provided and the lock ring may have external threads whereby it can be screwed to forceful abutment against the first ring 124 of the second contact device 140.

Furthermore, the coupling device 92 is fixed to the wheel axle housing 82 by the hoop 86 extending in the central groove 96 of the first contact device 94 and being secured thereto by means of the screws 88, 90 which are screwed into the threaded holes of the wheel axle housing 82.

Each of the annular material portions or pieces 112, 114 may be constructed from several layers of rubber elastic material, between which are mounted corresponding conical reinforcing elements or rings 127 of a strong and rigid material, e.g. metal. The volume of the rubber elastic material which can be forced out or can swell out at free end surfaces of the rubber elastic material can thereby be reduced and the compression resistance of this material can increase, while maintaining the desired pliability of the material in relation to shearing forces. A metal ring corresponding to the reinforcing rings, can mark the radially internal end of the rubber elastic device 110 and be glued to the adjacent rubber elastic material.

The coupling device's components, i.e. the first contact device 94, the rubber elastic device 110 and the second contact device 140 may be securely interconnected by means of, e.g., an adhesive or the like.

The first contact device 94 may be produced with or without end journals 106, 108, since the purpose thereof is to prevent a separation of the wheel axle housing and the connecting piece if the coupling device should fail.

It will therefore be understood that the rings 124, 126 may extend all the way to the longitudinal axis of the first contact device. Thus the radial extent of the material portions 112, 114 may be substantial, with the result that the portion of the connecting piece 68 which prevents a movement of the wheel axle housing in the vehicle's transverse direction and height direction is substantial, since an escape of rubber elastic material is largely prevented, while a deformation of this material as a result of shearing stresses becomes possible.

Even though there should be a need for end journals 106, 108, their diameter will be able to be much smaller than the diameter of the attachment areas 38, 40 according to the prior art, since the end journals 106, 108 act as an emergency device, which comes into force in the event of the destruction of the rubber elastic material device, and thus only require to be designed to withstand a load which occurs once.

Figure 5:
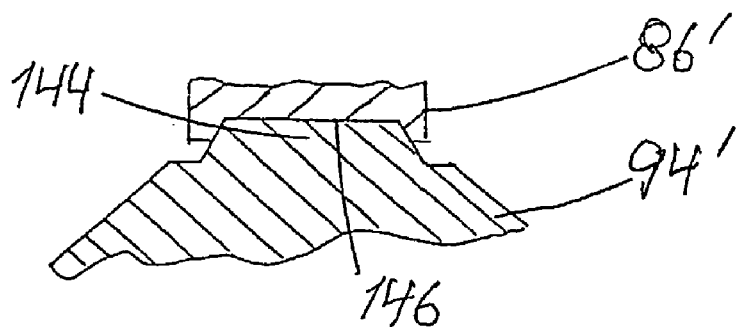
FIGS. 5–7 illustrate other possible embodiments of the coupling device and are sections corresponding to that indicated by A in FIG. 4, and through a second, third and fourth embodiment of the coupling device.

It is stated above that the contact device of the coupling device comprises a first contact device or axle with a first attachment area which is provided in the form of a circumferential, radially outwardly open groove, wherein there may be inserted a radially internal portion of a hoop. As illustrated in FIG. 5, a corresponding axle 94' may instead have a first attachment area which is provided in the form of a central, radially outwardly projecting bead 144, where a hoop 86' corresponding to the hoop 86 may have a radially inwardly projecting groove 146, which can be brought into engagement with the bead 144 in order to secure the axle 94'.

Figure 6:
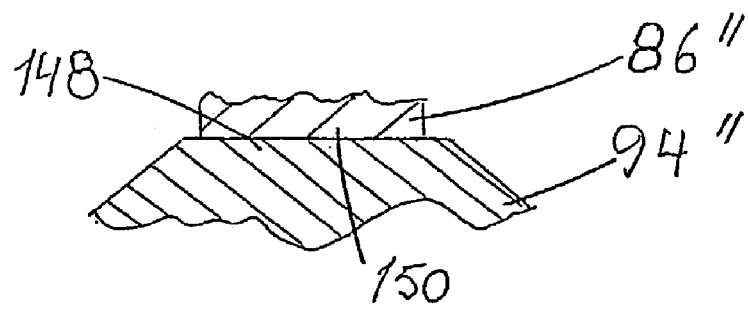

It will further be appreciated that a corresponding axle 94" may have a cylindrical, central portion 148 and that, instead of a groove or a bead, a corresponding hoop 86" may have a radially inwardly facing cylindrical portion 150, which can be brought into abutment against the cylindrical portion 148 of the axle 94", as illustrated in FIG. 6. If the hoop 86" is sufficiently firmly secured to the axle 94", the object can be achieved that the frictional force which is exerted between these components is so great that a relative movement of the hoop 86" and the axle 94" is prevented.

Figure 7:
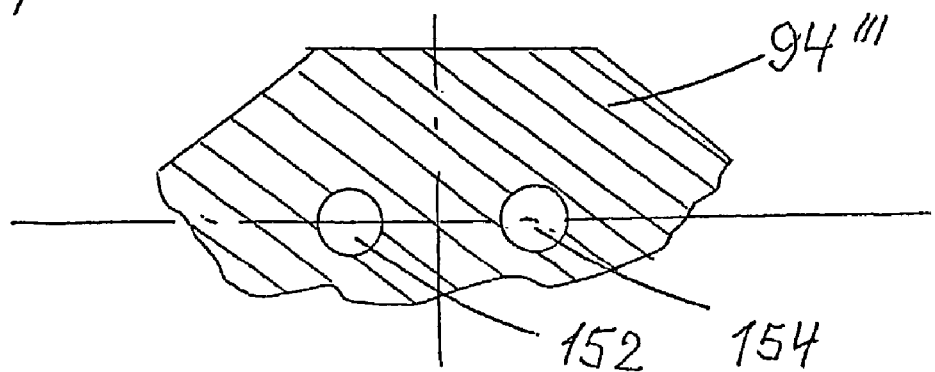

Finally, an axle 94''', as illustrated in FIG. 7, may instead by attached to a wheel axle housing by means of, e.g., two screws (not shown) which extend through holes 150, 152 in the shaft 94''', and which can be screwed into threaded holes which are provided in the wheel axle housing (not shown).

A coupling device is described above for use in connection with a vehicle. It will be appreciated, however, that this coupling device may be employed in connection with any kind of device where there is a need for a corresponding relative movement of two objects, such as any other kind of transport means or other device. Even though it is stated above that the coupling device 92 connects the connecting piece 68 to the wheel axle housing 82, it will therefore be understood that a coupling device according to the invention is generally arranged to connect two objects with each other in the above-described manner.

What is claimed is:

1. A coupling device for elastic interconnection of a first and a second object, comprising a rubber elastic material having two annular material portions, each of which extends round a longitudinal axis at an axial distance apart and with an inner and an outer, substantially conical side facing towards and away from the longitudinal axis respectively, a first contact device which extends axially through the annular material portions and has first contact portions which are arranged to abut against respective inner sides of the annular material portions, a second contact device attached to one of the objects and having second contact portions which are arranged to abut against respective outer sides of the annular material portions, the first contact device having a first attachment area, whereby the first contact device can be attached to the other of said objects, wherein the first attachment area is located between the first contact portions, viewed in the direction of the longitudinal axis and wherein the first contact device is provided in the form of an axle and the first attachment area is provided in the form of a radially outwardly open, circumferential groove.

2. A coupling device for elastic interconnection of a first and a second object, a rubber elastic material having two annular material portions, each of which extends round a longitudinal axis at an axial distance apart and with an inner and an outer, substantially conical side facing towards and away from the longitudinal axis respectively, a first contact device which extends axially through the annular material portions and has first contact portions which are arranged to abut against respective inner sides of the annular material portions, a second contact device attached to one of the objects and having second contact portions which are arranged to abut against respective outer sides of the annular material portions, the first contact device having a first attachment area, whereby the first contact device can be attached to the other of said objects, wherein the first attachment area is located between the first contact portions, viewed in the direction of the longitudinal axis and wherein the first contact device is provided in the form of an axle and the first attachment area is provided in the form of a circumferential bead.

3. The coupling device according to claim 1 or 2, wherein the material portions comprise at least one conical reinforcing piece approximately corresponding to the conical shape of the material portions.

4. The coupling device of claim 1 or 2, wherein the one object is a wheel axle housing of a vehicle and the other object is two arms which are connected to a frame of the vehicle.

* * * * *